(No Model.) 3 Sheets—Sheet 2.

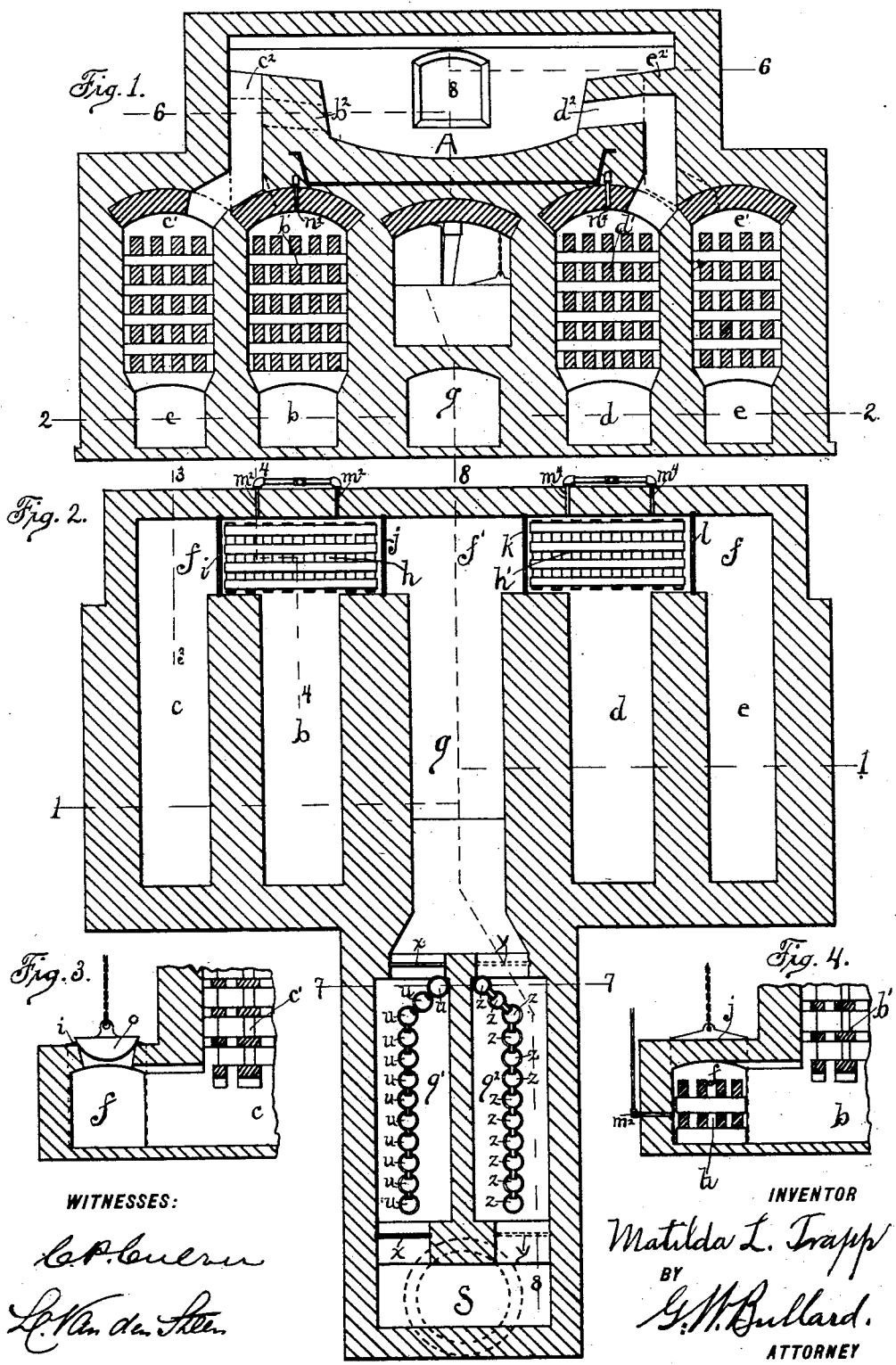

M. L. TRAPP.
SMELTING AND REFINING FURNACE.

No. 587,622. Patented Aug. 3, 1897.

WITNESSES:

INVENTOR
Matilda L. Trapp.
BY
G. W. Bullard.
ATTORNEY (No Model.) 3 Sheets—Sheet 3.
M. L. TRAPP.
SMELTING AND REFINING FURNACE.

No. 587,622. Patented Aug. 3, 1897.

WITNESSES:

INVENTOR
Matilda L. Trapp.
BY
G. W. Bullard,
ATTORNEY

UNITED STATES PATENT OFFICE.

MATILDA L. TRAPP, OF TACOMA, WASHINGTON, ASSIGNOR TO THE HYDRO SMELTING AND REFINING COMPANY, OF SAME PLACE.

SMELTING AND REFINING FURNACE.

SPECIFICATION forming part of Letters Patent No. 587,622, dated August 3, 1897.

Application filed August 20, 1896. Serial No. 603,393. (No model.)

*To all whom it may concern:*

Be it known that I, MATILDA L. TRAPP, a citizen of the United States, residing at the city of Tacoma, in the county of Pierce and State of Washington, have invented a certain new and useful Improvement in Smelting and Refining Furnaces, of which the following is a full, clear, and concise description, reference being had to the accompanying drawings, forming a part of this specification.

My invention relates to smelting-furnaces in which superheated gas is used as a fuel; and its objects are to utilize in a direct and simple manner the heat of the heretofore waste products of the combustion in the manufacture of the fuel-gas from steam and oil wholly within the furnace and to utilize the heat of the heretofore waste products of combustion to aid in refining the bullion as it is drawn from the smelting-pit, as hereinafter described.

Previous to my invention fuel-gas has usually been supplied from a separate generator or reservoir and conveyed to the furnace through a checker-work of highly-heated refractory material, which served to superheat the gas, then passed into the pit or hearth of the furnace, where it came in contact with air superheated in the same manner. The heated gas there combining with the oxygen of the heated air produces a high heat within the hearth where the metal or ores are placed to be heated or smelted. The waste products of combustion pass out the opposite side of the hearth from which the gas is supplied through other chambers of refractory material to the smoke-stack, and thus heat the said other refractory material, to be used in its turn for superheating the fuel-gas and air. In my invention I utilize in this process of the heretofore waste products of combustion the heat by causing it to assist in the decomposition of steam and oil, and thus produce the gas wholly within the furnace and directly in proportion as it may be desired to be used, and further to utilize a part of the remaining waste heat in refining bullion or metals as drawn from the smelting-hearth.

My invention will be more readily understood by reference to the accompanying drawings, in which—

Figure 5:
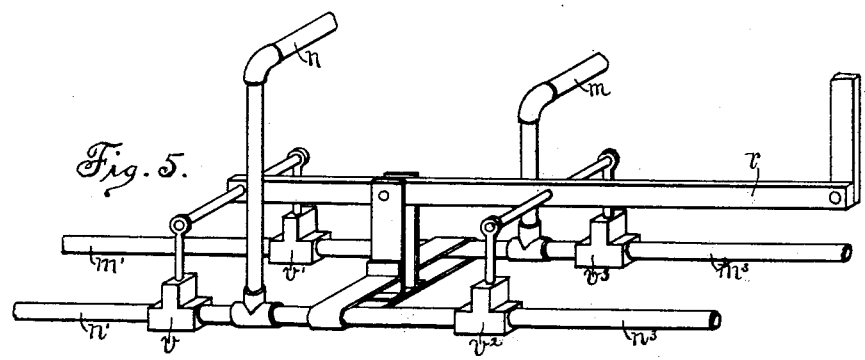
Figure 6:
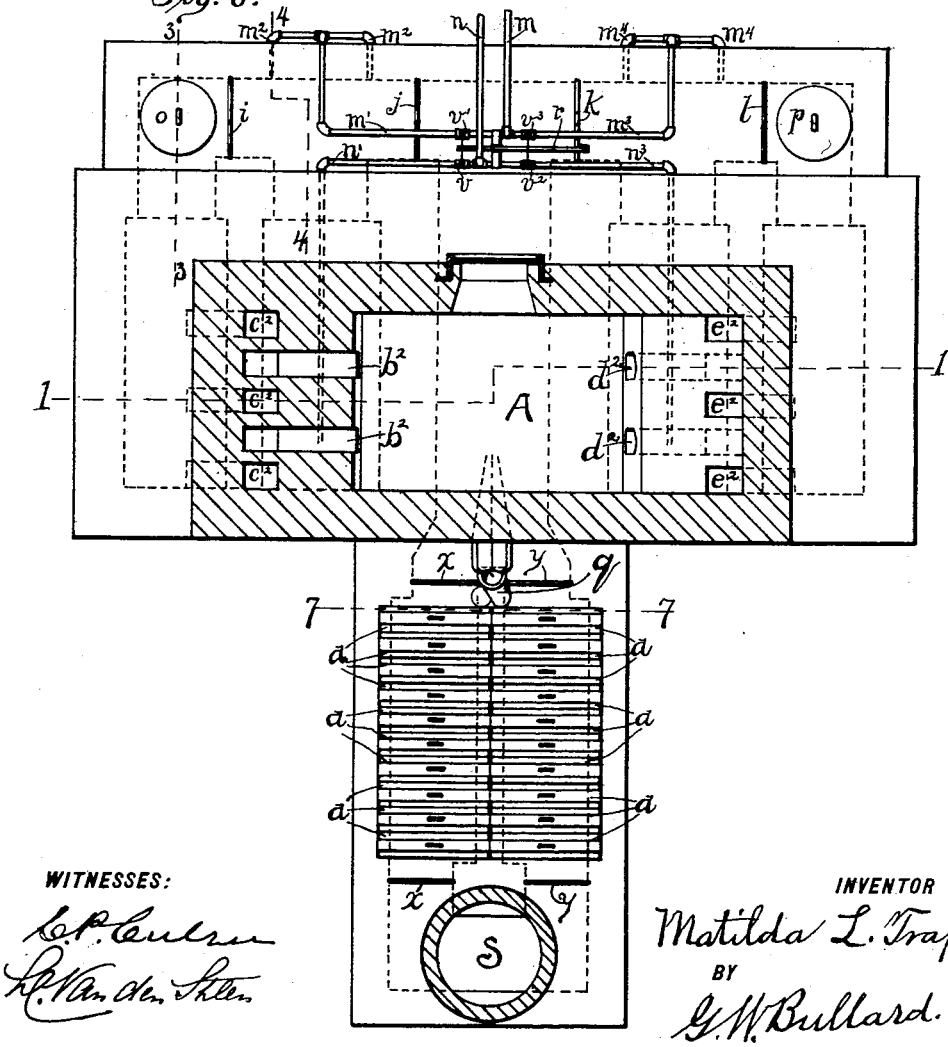
Figure 7:
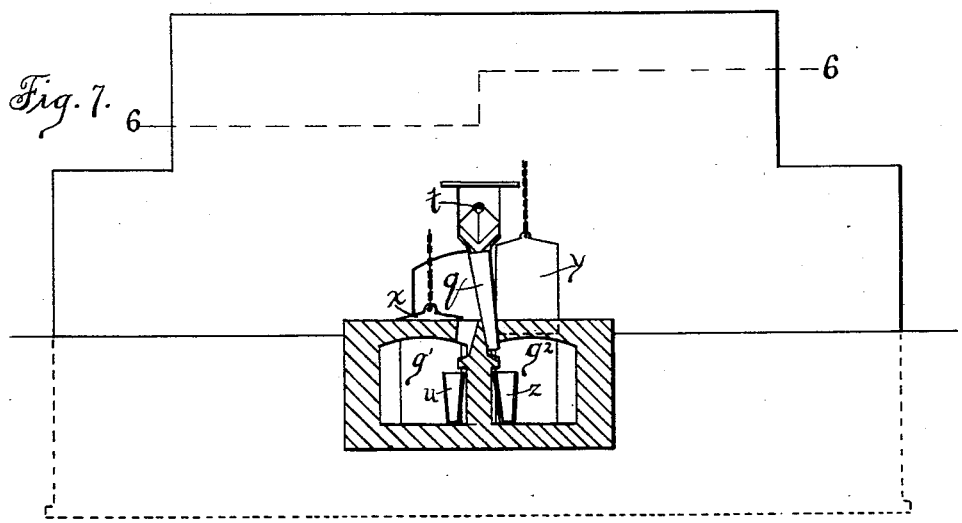
Figure 8:
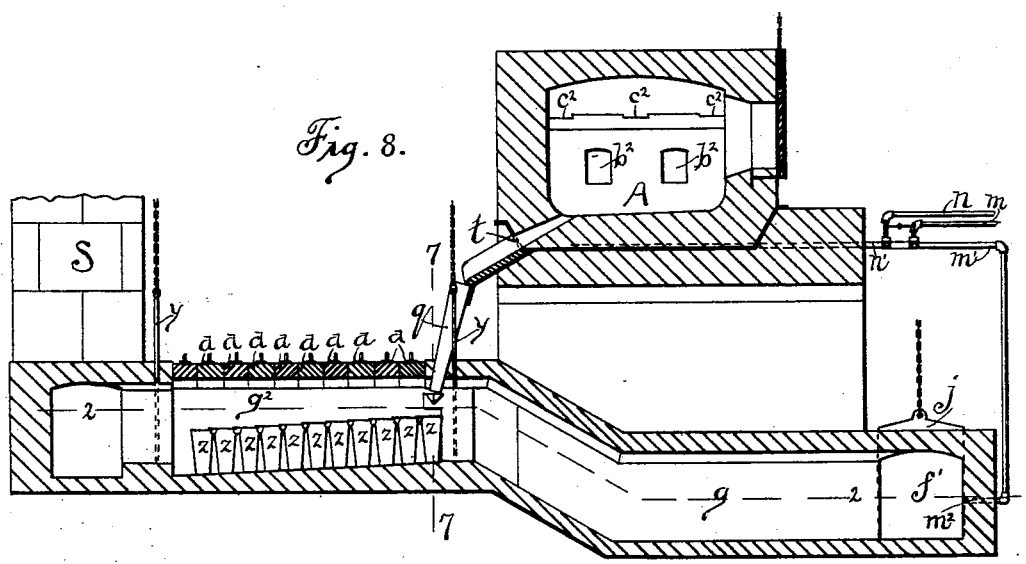
Figure 9:
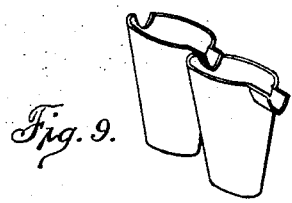
Figure 10:
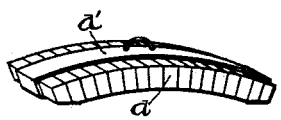

Figure 1 is a vertical cross-section of a furnace at broken line 1 1 and shows the arrangement of the chambers of refactory material with reference to the smelting hearth or pit and the flues leading to and from them. Fig. 2 is a horizontal section at 2 2 and shows the plan of the flues connecting the refractory-material chambers with the smoke-stack; also, the location of the gates for reversing the draft, the lattice-work of refractory material, and the manner of arranging the bullion-crucibles in the refining-flues. Fig. 3 is a partial vertical section at 3 3, showing the mushroom-valve for admitting air to the flue leading through the chambers filled with a checker-work of refractory material to the hearth. Fig. 4 is a similar section at 4 4, showing the flue filled with a lattice-work of refractory material and the pipe for supplying steam which is to be superheated by passing therethrough on its way to the chamber $b'$ filled with the checker-work of refractory material. Fig. 5 is a perspective outline of the reversing-gear by means of which the supply of steam and oil used in making the fuel-gas is turned alternately from one side of the furnace to the other. Fig. 6 is a horizontal section at 6 6 through the smelting-pit and shows the location of the flues at either side thereof and through which the gas and air are admitted and the products of combustion escape as they are alternately used for these purposes. A top view of the lower part of the furnace is also shown, from which is obtained a comprehensive idea of the arrangement of the reversing-gear, the steam and oil pipes, the flue-gates, and the mushroom-valves and how the furnace may be operated by them. Fig. 7 is a rear elevation of the furnace, showing the tap-hole, with a cross-section of the refining-flue at 7 7, and shows the manner of conducting the bullion to the refining-flues. Fig. 8 is a vertical section at 8 8 through the center of the furnace and one of the refining-flues to illustrate more clearly the construction and operation of the same. Fig. 9 is a small perspective outline of the bullion-molds, and Fig. 10 is a sketch of one of the clamps or covers used over the refining-flues.

Similar letters refer to similar parts throughout the several views.

I have illustrated my invention as applied to the well-known Siemens type of furnace, it being understood that it may be applied to any form of furnace or in any place where the heat or waste products of combustion are available.

The Siemens furnace is usually constructed and operated by means of two sets of flues and superheating-chambers so arranged that the smelting hearth or pit will be between them. By means of this arrangement the gas and air are supplied through one set of flues and chambers and the waste products of combustion pass out through the other set of flues and chambers to the smoke-stack and thus heat them for a reverse run from the other side. I may be more clearly understood by referring to the drawings in Fig. 1.

The hearth or pit A is where the minerals or ores are to be placed to be heated or smelted. The flues $b$ and $d$ are passages through which gas is conducted from an outside reservoir or other source of supply, and $c$ and $e$ are flues through which air is conducted to produce combustion.

It will be seen in Fig. 2 that each of the flues opens into a connecting-flue $f$, which connects at $f'$ with the main flue $g$, that leads to the smoke-stack S. By means of the gates $i, j, k,$ and $l$, located in $f$, the flues $b, d, c,$ and $e$ may be connected or disconnected with S, as necessity may require.

We will suppose the furnace in operation and the gas and air to be shut off from $d$ and $e$, and the gates $k$ and $l$ are open, so as to connect them with $g$. Then flue $c$ is opened to the air and gas is turned into flue $b$, while the gates $i$ and $j$ are closed. The gas and air pass up through $b'$ and $c'$, respectively, which are chambers filled with a checker-work of highly-heated refractory material, and finally issue into the hearth A at $b^2 c^2$, where the gas unites with the oxygen of the heated air and combustion takes place.

The waste products of combustion pass out through the openings $d^2 e^2$ at the opposite side of the hearth and down through the checker-work of refractory material in chambers $d'$ $e'$, thus heating them for the next reverse run, then through the flues $d$ and $e$ and $f$ and $g$ to the smoke-stack. After a run in this way for twenty or thirty minutes the operation is reversed by shutting the gas off from $b$ and the air off from $c$. The gates $i$ and $j$ are opened and $k$ and $l$ closed. The gas is now turned into $d$ and air into $e$, which causes the furnace to work in the opposite direction, the operation being the same as above described. In this way the furnace is alternately operated from side to side as long as desired.

By means of my invention I am enabled to utilize the heat of the waste products of combustion above referred to in the manufacture of the fuel-gas itself, and all within the furnace and directly in proportion as it is required to be used. To do this, I fill a section of the connecting-flue $f$ between the gates $i$ and $j$ and in front of $b$ with a lattice-work of incombustible refractory material, put in spaced layers alternately crossing each other, so as to form a tortuous passage for the waste products of combustion, as may be seen at $h$, Figs. 2 and 4. Between the gates $k$ and $l$ I fill another section of $f$ with a lattice-work of refractory material in the same way, as may be seen at $h'$, to equip the opposite side of the furnace in the same manner as at $h$. The refractory material thus placed is alternately heated by the passage of the waste products of combustion to the smoke-stack. I now by means of the reversing-gear shown in Fig. 5 and properly-arranged pipes connected therewith bring steam from any suitable supply and discharge it among this heated refractory material alternately as the gas is to be supplied on one or the other side of the furnace. In a similar manner and by the same means I supply oil to the chambers $b'$ and $d'$ and discharge it on the checker-work of highly-heated refractory material alternately to correspond with the steam-supply. The steam is supplied through pipe $m$ and discharged at $m^2$ and $m^4$ alternately, and the oil is supplied through pipe $n$ and discharged at $n^2$ and $n^4$ alternately.

The furnace being equipped as herein briefly described and as shown in the drawings, it is ready for producing its own fuel-gas.

The furnace being heated for use the operation is as follows: Suppose the flues $d$ and $e$ to be connected with flue $g$ by the gates $k$ and $l$ being opened. The gates $i$ and $j$ are closed and the mushroom-valve $o$ is raised, allowing air to enter flue $c$. The valves $v^2 v^3$ of the reversing-gear are closed and $v\ v'$ are opened, so that steam coming through $m$ will pass through $m'$ and be discharged at $m^2$ among the lattice-work $h$, and coming in contact with the highly-heated material it is at once highly superheated. The oil coming through $n$ is conducted through $n'$ and discharged at $n^2$, where it comes in contact with the highly-heated refractory material $b'$ and is at once vaporized. Then meeting the highly-heated steam coming from the heated material $h$ the intense heat of the refractory material causes them to unite and form a fixed hydrocarbon gas, which then passes on and issues from the outlets $b^2$, where it comes in contact and combines combustively with the oxygen of the heated air issuing from the openings $c^2$, the air having come from flue $c$ through the checker-work of highly-heated refractory material $c'$. This combustion which takes place at $b^2 c^2$ produces a high heat within the hearth A, where the ores or minerals are placed to be smelted. The waste products of combustion pass through the outlets $d^2 e^2$, and in their passage to the smoke-stack heat the refractory material in $d'\ e'$ and at $h'$. A run having continued thus for twenty or thirty minutes the rocker-arm $r$ of the reversing-gear is manipulated, closing the valves $v\ v'$ and opening the valves $v^2\ v^3$, and thus conducting the steam and oil to the other side or end of the furnace. The valve $o$ is closed and the gates $i$ and $j$ are opened, while valve $p$ is opened and gates $k$ and $l$ are closed, all of which reverses the operation of the entire furnace. The steam now passes through pipe $m^3$ and is discharged at $m^4$ among the material $h'$, where it is highly superheated, then meets and unites with the vaporized oil which is discharged on the refractory material $d'$, the oil having been conducted through valve $v^2$, pipe $m^3$, and discharged at $m^4$. The gas thus formed issues through outlets $d^2$ and combines combustively with the heated air issuing from outlets $e^2$. The waste products of combustion now pass through the outlets $b^2\ c^2$, the refractory-material chamber $b'\ c'$, and the material $h$ to the smoke-stack, thus reheating that side of the furnace for the next gas-run.

It will be observed that I thus utilize in the manufacture of the fuel-gas a considerable portion of the heat of the waste products of combustion, and, further, that the construction and operation of my invention are very simple, direct, and economical.

It is to be observed that gas produced from steam and oil, as herein described, and brought in combustion with the heated air is the most effective means of producing the high heat necessary to smelt any kind of mineral. The component elements can be so proportioned while operating the furnace that a high heat of any desired degree can be obtained at the will of operator. By this process the most refractory ores can be smelted.

It is to be observed that the component gases being pure and free of sulfur will consume the sulfur and other impurities found in ores and utilize them in combustion and thus destroy the fumes heretofore resulting from the operation of smelting-furnaces in which sulfurous fuels are used, and, further, the loss of precious metal by being volatilized while being smelted will thus be avoided.

The principal feature of my invention is an arrangement by means of which the heat of the waste products of combustion is further utilized as a means of refining the bullion after it is drawn from the hearth. The main flue $g$, after passing to the rear of the furnace, is divided into two flues $g'$ and $g^2$, as shown in Fig. 2. The flue $g'$ is provided with a gate $x\ x$ at each end, and the flue $g^2$ is likewise provided with gates $y\ y$, so that by alternately opening and closing each pair of gates the draft may be changed from one flue to the other in going to the smoke-stack. Each flue is covered or closed in by a set of movable clamps or covers $a\ a\ a$, so each can be readily opened to the atmosphere. These covers are made of an arch of fire-brick fitted in a curved iron clamp $a'$, as seen in Fig. 10. The flues are designed to receive the metal crucibles or molds into which the bullion is poured when drawn from the hearth A. The crucibles are made of a form shown by Fig. 9, and are set in place as shown at $u\ u\ u$ and $z\ z\ z$, Fig. 2, and on an incline, as indicated in Fig. 8. Each crucible is provided with an overflow-spout that is made to fit into a side of the adjoining crucible, so that when full it will overflow into the next crucible in line, as seen in Fig. 9.

The crucibles being arranged in a flue the clamps $a\ a\ a\ a$ are put on, thus closing the flue in, and the gates, as $y\ y$, are opened, causing the draft to pass through $g^2$, as indicated in Figs. 2, 7, and 8. The heat of the waste products of combustion passing about the crucibles to the smoke-stack soon causes them to become highly heated. The tap-hole $t$ is then opened and the melted bullion, flowing into the funnel or sleeve $q$, is conducted into the first of the crucibles $z$, from which it overflows into the other crucibles, one at a time, until all are filled. The crucibles being highly heated the bullion is kept in the molten state, thus allowing the metals to separate more fully in strata, according to their specific gravity, than had the bullion been run into cold molds in the open air and become suddenly cooled. In the meantime the gates of flue $g'$ have been shut, the flue opened, the bullion in it allowed to cool, then removed, and the crucibles replaced ready to be filled while flue $g^2$ is being vacated. In this way each flue can be alternately used to receive and refine the bullion, as above described. It is obvious that more than two flues may be arranged in this way and each made of any size and length desired according to the capacity of the furnace.

It is evident that my invention is susceptible to modifications, and I have not therefore limited myself to details of construction, but have briefly outlined the ideas involved, so as to set forth in a clear and concise manner the novelty of my invention.

I am aware that previous to my invention gases have been made from liquid hydrocarbons and the liberated gases of decomposed steam by means of heated chambers or retorts of various forms. I therefore do not claim such an idea in a broad or abstract sense; but What I do claim as new, and desire to secure by Letters Patent, is—

1. In a smelting-furnace, having two sets of flues, and superheating-chambers above the same filled with lattice-work of refractory material and in communication with the furnace-hearth, and adapted to be used in alternation as specified, the combination therewith of the flue $f$ connecting each set of said flues and in communication with the smoke-stack, said connecting-flue being provided with lattice-work of refractory material opposite to the fuel-gas flue and below the refractory-material chamber, gates and valves for reversing the air-supply, and reversing-gear with pipe connections to supply steam and oil alternately to one or the other side of the furnace as described, said steam connections opening into the connecting-flue containing the refractory lattice-work to superheat the steam before combining with the oil, and said oil connections opening into the superheating-chamber containing the refractory lattice-work to vaporize the oil preparatory to the superheated steam combining therewith, substantially as and for the purposes described.

2. In a smelting-furnace having two sets of flues and superheating-chambers in communication with the furnace-hearth, arranged in alternation to permit one set to be used for the passage of air and fuel-gas to the hearth and the other set for the passage of the waste products of combustion from the hearth to the smoke-stack, and oil-pipe connections opening into one set of the superheating-chambers to enable the oil to be vaporized therein before superheated steam is combined therewith; the combination therewith of flues containing lattice-work of refractory material and in communication with the chambers wherein the oil is vaporized, steam-pipe connections opening into said flues to permit the steam to be superheated before entering the superheating-chamber in which the oil is vaporized, valves and gates for reversing the draft and the air-supply, and reversing mechanism for supplying steam and oil in alternation to the steam-superheating flues and the chambers wherein the oil is vaporized, substantially as and for the purposes described.

3. In a smelting-furnace having two sets of flues and superheating-chambers in communication with the furnace-hearth, arranged in alternation to permit one set to be used for the passage of air and fuel-gas to the hearth and the other set for the passage of the waste products of combustion from the hearth to the smoke-stack, and a smoke-flue leading to the smoke-stack, the combination therewith of a plurality of refining-flues interposed between said smoke-flue and smoke-stack provided with gates to cut off the waste products of combustion from one of the refining-flues while permitting it to pass through the other, refining-crucibles in each of the refining-flues to receive the melted bullion drawn from the hearth, said crucibles being thereby heated by the waste products of combustion in their passage to the smoke-stack and said products being utilized for separating and refining the precious metals of the bullion, substantially as and for the purposes described.

4. In a smelting-furnace having two sets of flues and superheating-chambers in communication with the furnace-hearth, arranged in alternation to permit one set to be used for the passage of air and fuel-gas to the hearth and the other set for the passage of the waste products of combustion from the hearth to the smoke-stack, and a smoke-flue leading to the smoke-stack, the combination therewith of a plurality of refining-flues interposed between said smoke-flue and smoke-stack provided with gates to cut off the waste products of combustion from one of the refining-flues while permitting it to pass through the other, refining-crucibles in each of the refining-flues discharging one into the other and receiving the melted bullion drawn from the hearth, said crucibles being thereby heated by the waste products of combustion in the passage to the smoke-stack and said products being utilized for separating and refining the precious metals of the bullion, substantially as and for the purposes described.

In testimony whereof I have signed my name this 14th day of August, 1896.

MATILDA L. TRAPP.

Witnesses:
  A. G. AVERY,
  A. H. BULLARD.